(12) United States Patent
Vollert et al.

(10) Patent No.: US 9,156,450 B2
(45) Date of Patent: Oct. 13, 2015

(54) METHOD FOR OPERATING A BRAKE-BOOSTED HYDRAULIC BRAKE SYSTEM OF A VEHICLE AND CONTROL DEVICE FOR A BRAKE-BOOSTED HYDRAULIC BRAKE SYSTEM OF A VEHICLE

(75) Inventors: Herbert Vollert, Vaihingen/Enz (DE); Frank Kneip, Bruchmuhlbach-Miesau (DE)

(73) Assignee: ROBERT BOSCH GMBH, Stuttgart (DE)

( * ) Notice: Subject to any disclaimer, the term of this patent is extended or adjusted under 35 U.S.C. 154(b) by 287 days.

(21) Appl. No.: 13/579,080

(22) PCT Filed: Dec. 15, 2010

(86) PCT No.: PCT/EP2010/069692
§ 371 (c)(1),
(2), (4) Date: Feb. 22, 2013

(87) PCT Pub. No.: WO2011/098175
PCT Pub. Date: Aug. 18, 2011

(65) Prior Publication Data
US 2013/0173130 A1    Jul. 4, 2013

(30) Foreign Application Priority Data
Feb. 15, 2010 (DE) .......................... 10 2010 001 941

(51) Int. Cl.
*B60L 7/18* (2006.01)
*B60T 8/00* (2006.01)
(Continued)

(52) U.S. Cl.
CPC ................. *B60T 8/171* (2013.01); *B60T 7/042* (2013.01); *B60T 8/4077* (2013.01); *B60T 13/14* (2013.01); *B60T 13/745* (2013.01)

(58) Field of Classification Search
CPC ....... B60T 7/042; B60T 8/4077; B60T 7/122; B60T 1/10; B60T 8/326; B60T 8/367; B60T 8/4081; B60T 8/00; B60T 8/369; B60T 8/321; B60T 8/17616; B60T 13/573; B60T 8/4022; B60W 30/18118; B60L 7/18; B60K 23/08
USPC ...................... 701/70; 303/13, 116.4; 60/553; 180/247; 188/72.2
See application file for complete search history.

(56) References Cited

U.S. PATENT DOCUMENTS 4,771,852 A * 9/1988 Nishikawa et al. ........... 180/247
(Continued)

FOREIGN PATENT DOCUMENTS

CN         1706700 A      12/2005
CN       101287633 A      10/2008
(Continued)

OTHER PUBLICATIONS

International Search Report, PCT International Application No. PCT/EP2010/069692, dated Apr. 12, 2011.

*Primary Examiner* — Tuan C. To
*Assistant Examiner* — Yuri Kan
(74) *Attorney, Agent, or Firm* — Kenyon & Kenyon LLP

(57) ABSTRACT

A method and control device for operating a brake-boosted hydraulic brake system of a vehicle, including ascertaining information relating to an increase or a decrease in an additional braking force exerted on at least one wheel in addition to a hydraulic braking force of the brake system, which increase or decrease is greater than a predefined minimum difference, altering an assistance force to a force introduction element, by a force difference, taking account of the ascertained information, so that the hydraulic braking force is altered to correspond to the increase or decrease in the additional braking force, and displacing a volume of a brake medium of the brake system between at least one accumulator chamber of at least one plunger and/or of at least one two-chamber cylinder and a volume of the brake system outside the accumulator.

10 Claims, 7 Drawing Sheets

(51) Int. Cl.
*B60T 8/171* (2006.01)
*B60T 7/04* (2006.01)
*B60T 8/40* (2006.01)
*B60T 13/74* (2006.01)
*B60T 13/14* (2006.01)

(56) References Cited

U.S. PATENT DOCUMENTS

| | | | | |
|---|---|---|---|---|
| 4,876,650 | A | * | 10/1989 | Kubo ............................. 701/79 |
| 5,645,143 | A | * | 7/1997 | Mohr et al. ................. 188/72.1 |
| 5,964,510 | A | * | 10/1999 | Nakazawa ................ 303/116.4 |
| 6,076,351 | A | * | 6/2000 | Sacristan ........................ 60/553 |
| 6,132,015 | A | | 10/2000 | Aoyama |
| 6,305,506 | B1 | * | 10/2001 | Shirai et al. ................. 188/72.2 |
| 2001/0006308 | A1 | * | 7/2001 | Kawahata et al. ............ 303/122 |
| 2002/0022918 | A1 | * | 2/2002 | Nakano ........................... 701/70 |
| 2005/0269875 | A1 | | 12/2005 | Maki et al. |
| 2007/0273204 | A1 | | 11/2007 | Kodama et al. |
| 2008/0106143 | A1 | * | 5/2008 | Yazaki et al. ................... 303/13 |
| 2009/0018739 | A1 | * | 1/2009 | Ohmori et al. .................. 701/70 |
| 2009/0115242 | A1 | | 5/2009 | Ohtani et al. |
| 2009/0261649 | A1 | | 10/2009 | Higuma et al. |

FOREIGN PATENT DOCUMENTS

| | | |
|---|---|---|
| CN | 101549685 A | 10/2009 |
| DE | 199 12 866 | 9/1999 |
| DE | 10 2004 027 256 | 1/2005 |
| DE | 103 27 553 | 1/2005 |
| DE | 10 2005 024 577 | 11/2006 |
| DE | 10 2005 057 577 | 6/2007 |
| DE | 10 2007 000 264 | 11/2007 |
| DE | 10 2007 030 441 | 1/2009 |
| DE | 10 2007 062 839 | 6/2009 |
| DE | 10 2008 035 180 | 2/2010 |

* cited by examiner

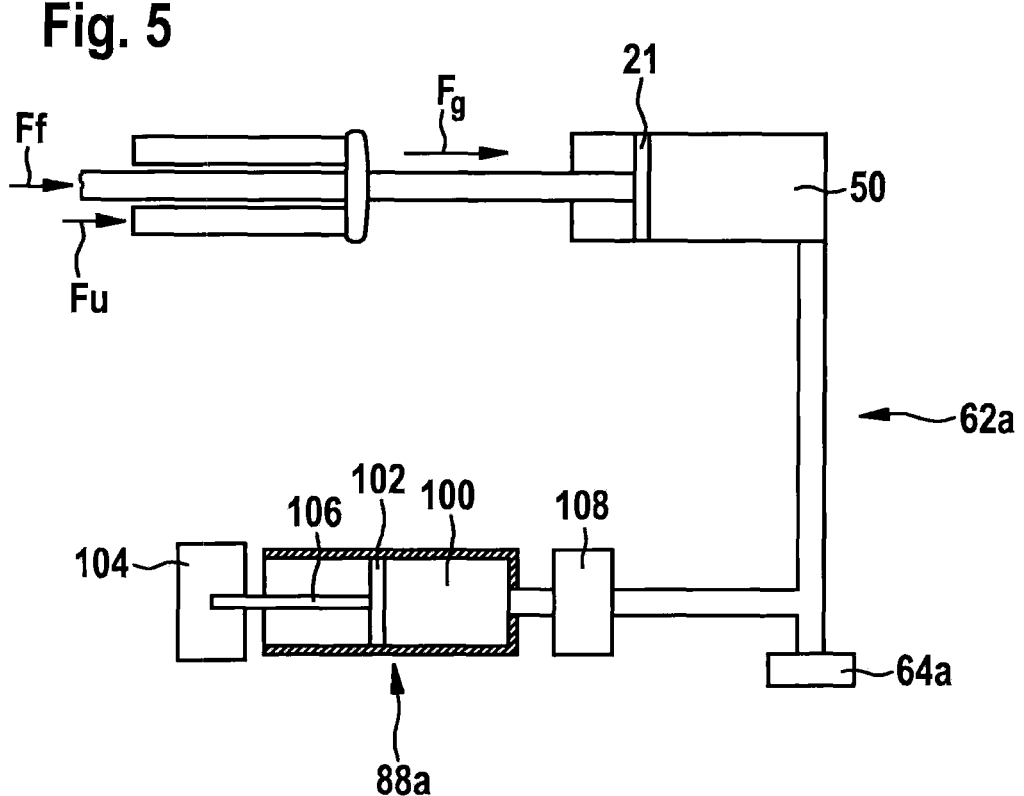
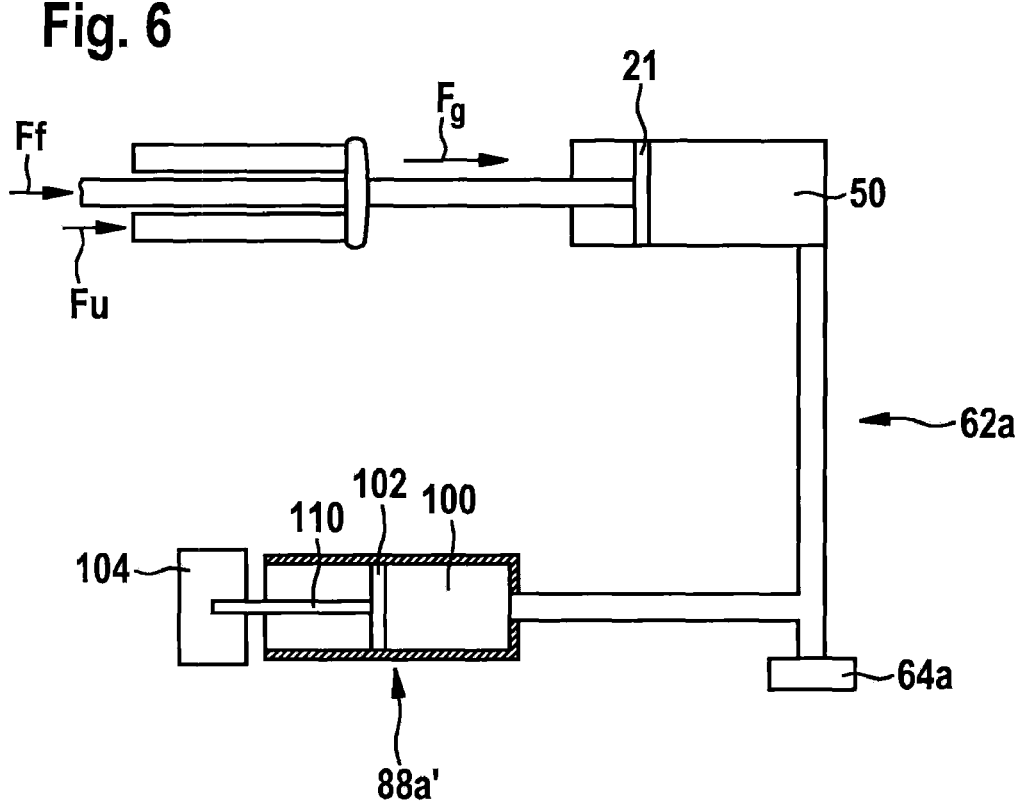

METHOD FOR OPERATING A BRAKE-BOOSTED HYDRAULIC BRAKE SYSTEM OF A VEHICLE AND CONTROL DEVICE FOR A BRAKE-BOOSTED HYDRAULIC BRAKE SYSTEM OF A VEHICLE

FIELD OF THE INVENTION

The present invention relates to a method for operating a brake-boosted hydraulic brake system of a vehicle. The present invention further relates to a control device for a brake-boosted hydraulic brake system of a vehicle.

BACKGROUND INFORMATION

To enable a driver of a vehicle to operate a brake input element of a brake system, for example a brake pedal, comfortably, a brake system generally includes a brake booster. The brake system with a brake booster is often referred to as a brake-boosted brake system.

A brake booster is configured to provide an assistance force which, in addition to a driver braking force exerted on the brake input element by the driver, brings about braking of at least one wheel. Suitable brake boosters are described, for example, in German Patent Application Nos. DE 10 2005 024 577 A1, DE 10057 557 A1 and DE 103 27 553 A1.

FIGS. 1A and 1B show schematic illustrations to explain a mode of operation of a conventional brake booster.

The brake system shown partially schematically in FIG. 1A has a brake input element 10 which is provided, for example, in the form of a brake pedal. By operating brake input element 10 the driver is able to apply a driver braking force Ff and a first adjustment travel s1 to a transmitting component of the brake system, for example to an input piston 12 (see equivalent circuit diagram of FIG. 1B). In addition, driver braking force Ff may be sensed by a brake input element sensor system (not shown). The brake input element sensor system includes, for example, a force sensor for measuring driver braking force Ff and/or a travel sensor for ascertaining first adjustment travel s1 of an adjustable component of brake input element 10.

The brake system additionally includes a brake booster 14. Brake booster 14 is configured to provide an assistance force Fu so that the driver does not have to apply the force required to brake his vehicle entirely in the form of a driver braking force Ff. Assistance force Fu provided by brake booster 14 may, for example, be a function of driver braking force Ff.

Brake input element 10 and brake booster 14 are arranged in the brake system in such a way that at least driver braking force Ff and assistance force Fu produce a total braking force Fg. Total braking force Fg may, however, also include at least one further force. For example, brake booster 14 transmits assistance force Fu and a second adjustment travel s2 to an assistance piston 16 which is coupled, together with input piston 12, to a force introduction element, such as the reaction disk 18 shown. In the equivalent circuit diagram of FIG. 1B, input piston 12 acts on a first point P1 and assistance piston 16 acts on a second point P2 of reaction disk 18. Points P1 and P2 may correspond to areas. For example, point P2 corresponds to an annular area in the case of a tubular assistance piston 16.

In that manner it is possible for total braking force Fg and a third adjustment travel s3 to be transmitted to a component disposed on the output side of the force introduction element, for example to output piston 20. In that arrangement, output piston 20 touches reaction disk 18 at a third point P3, or at a corresponding area.

A quotient x indicates the ratio of a first distance between points P2 and P3 and a second distance between points P3 and P1. In the case of an elastic reaction disk 18, reaction disk 18 is deformed at a driver braking force of Ff≠0 and/or at an assistance force of Fu≠0 (not illustrated in FIG. 1B). The deformability of reaction disk 18 may be given as elasticity e.

Output piston 20 is coupled to an adjustable component 21 of a master brake cylinder 22. A brake circuit (not shown) filled with a brake medium and having at least one wheel brake cylinder is connected to master brake cylinder 22. By changing a brake pressure in the at least one wheel brake cylinder, it is possible to exert a hydraulic braking torque corresponding to total braking force Fg, or a corresponding hydraulic braking force, on the at least one associated wheel.

German Patent Application No. DE 10 2007 030 441 A1 furthermore describes a motor vehicle brake system with a generator, and a corresponding method for operating a brake system having a generator. If, in addition to a hydraulic braking torque, a generator braking torque acts on at least one wheel, a simulation unit is to be actuated in such a way that a volume of hydraulic fluid corresponding to the generator braking torque is taken out of the brake system and temporarily stored in at least one accumulator chamber of the simulation unit in order to reduce the hydraulic braking torque by the generator braking torque. Correspondingly, on deactivation of the generator braking torque, the volume of hydraulic fluid is to be returned to the hydraulic brake system for an increase in the hydraulic braking torque.

SUMMARY

The present invention provides a method for operating a brake-boosted hydraulic brake system of a vehicle, and a control device for a brake-boosted hydraulic brake system of a vehicle.

Advantageous example embodiments of the method and the control device are described below.

The present invention makes it possible to adapt the assistance force of the brake booster to the at least one additional braking force exerted on at least one wheel of the vehicle and, in particular, in advantageous embodiments, makes it possible to compensate for and/or to blend the at least one additional braking force with the aid of the adapted assistance force. Equally, by displacing a volume between the at least one accumulator chamber of the at least one plunger and/or of the at least one two-chamber cylinder and the volume of the brake system outside the accumulator, it is possible to obtain an optimized position/reaction ability of the brake input element operated by the driver, despite the variation of the assistance force. This ensures improved operating comfort for the driver when operating the brake input element to specify the desired target total braking torque of the vehicle.

The method according to the present invention and the corresponding control device may be used in an inexpensive brake system of a simple construction. In particular, to carry out the method and to use the control device, no expensive sensor systems are required for the brake system.

By virtue of the use of at least one plunger and/or at least one two-chamber cylinder, filling of the at least one accumulator chamber with brake medium or removal of brake medium from the at least one accumulator chamber is associated with no perceptible noise for the driver and/or with no movement (vibration) of the brake input element noticeable by the driver. This is associated with a significant improvement in the NVH (noise, vibration, and harshness) values of the brake system. In particular, the at least one plunger and/or the at least one two-chamber cylinder allows a "soft" displacement of a volume of brake medium into or out of the at least one accumulator volume. Advantageously, that "soft" displacement can be neither heard nor felt by the driver, without its being necessary to close an isolating valve required between the at least one plunger and/or the at least one two-chamber cylinder and the master brake cylinder. This may be utilized especially to dispense with installation of such an isolating valve in the brake system.

For example, as will be explained in greater detail with reference to the following embodiments, with the present invention it is possible for blending of the at least one exerted additional force to be performed without this being noticed by the driver by way of feedback, for example a sensation of the brake input element being "pulled" in. At the same time, even during application of the technology according to the invention, the driver is able to make an active and direct braking input into the at least one wheel brake cylinder of his brake system. If, for example, the driver presses the brake pedal while the technology according to the invention is being implemented, then the full assistance force of the brake booster may be additionally used for a rapid buildup of a high hydraulic braking torque.

The present invention has, in particular, the advantage over German Patent Application No. DE 10 2007 030 441 A1 that blending of the additional generator braking torque already takes place before the total braking force is exerted on the adjustable component of the master brake cylinder. Owing to the corresponding reduction of the support power at the brake booster, the initial pressure, or the volume displaced by the master brake cylinder, is reduced. In that manner it is also possible to reduce the volume that is to be displaced into the at least one accumulator chamber. This allows a reduction in the size of the accumulator chamber compared with a conventional accumulator chamber required for implementing the technology described in German Patent Application No. DE 10 2007 030 441 A1. Owing to the saving in installation space, additional components may be more easily installed in the vehicle. At the same time, the work to be performed by the at least one brake medium delivery element, for example an electric motor of a plunger, may be reduced. Thus, it is possible for lower-cost pumps, valves, plungers and/or two-chamber cylinders to be used. A rapid return of volume from the at least one accumulator chamber, which involves markedly increased motor effort, is not necessary for a rapid buildup of a high hydraulic braking torque.

By virtue of the use of at least one plunger and/or at least one two-chamber cylinder, a pressure estimation and/or a pressure calculation using the actuation signals and, where applicable, the measuring signals of the at least one plunger and/or the at least one two-chamber cylinder are additionally possible as an alternative to the use of a pressure sensor. Suitable actuation and/or measuring signals are, for example, an actuation current and/or a travel-measuring signal at an adjustable element of the at least one plunger and/or of the at least one two-chamber cylinder.

BRIEF DESCRIPTION OF THE DRAWINGS

Further features and advantages of the present invention are described below with reference to the Figures.

FIG. 5 shows a schematic illustration of a first exemplary embodiment of a plunger of the hydraulic brake system.

FIG. 6 shows a schematic illustration of a second exemplary embodiment of a plunger of the hydraulic brake system.

DETAILED DESCRIPTION OF EXAMPLE EMBODIMENTS

Figure 1A:
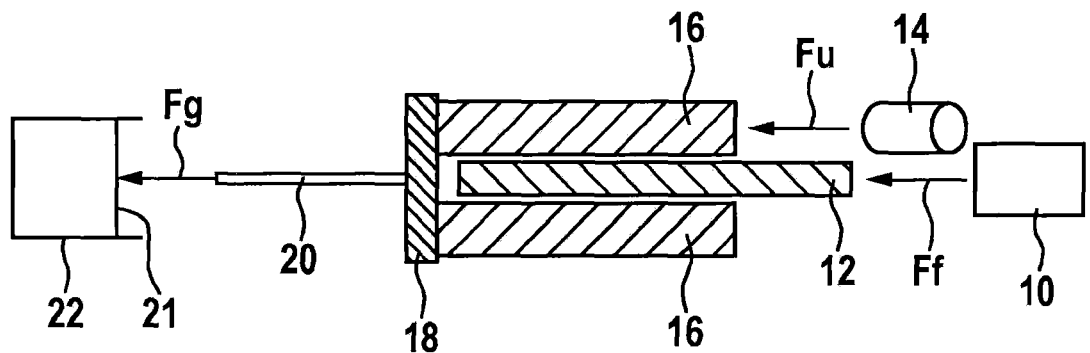
FIGS. 1A and 1B show schematic illustrations to explain a mode of operation of a conventional brake booster.
Figure 1B:
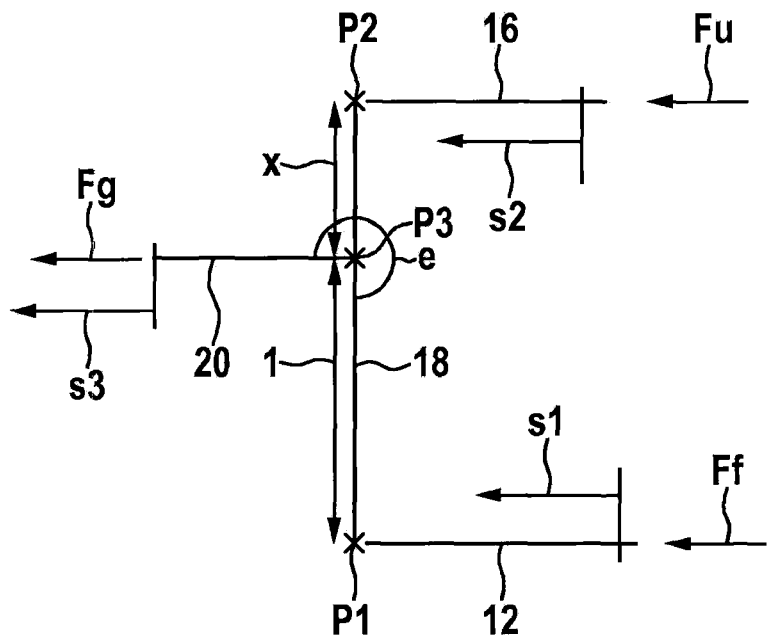
Figure 2:
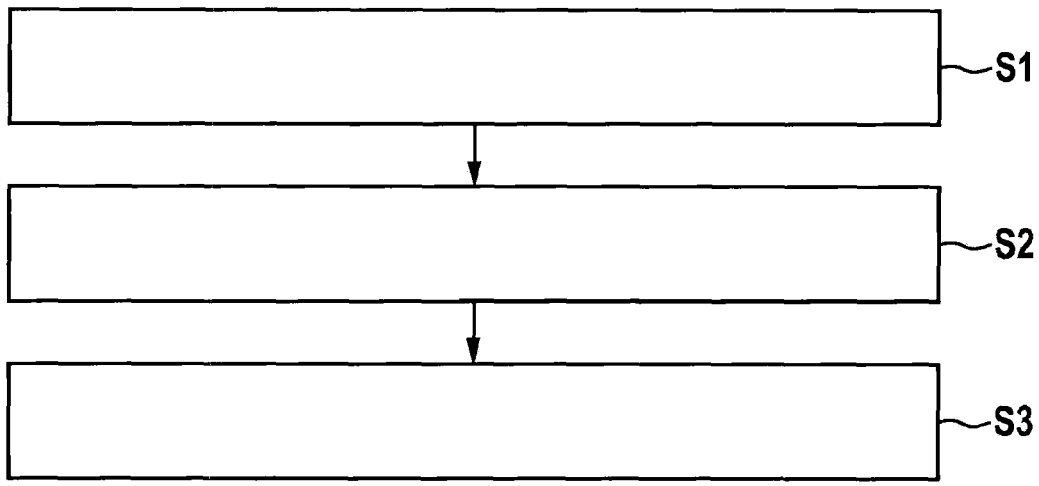
FIG. 2 shows a flow diagram to illustrate a first example embodiment of the method.

FIG. 2 shows a flow diagram to illustrate a first example embodiment of a method in accordance with the present invention.

In a method step S1, information is ascertained regarding an increase or a decrease in at least one additional braking force exerted on at least one wheel of the vehicle in addition to a hydraulic braking force of the brake system. The information may include a quantity, a signal and/or a measured value that describe(s) that at least one additional force is being exerted on the at least one wheel in addition to the hydraulic braking torque of the brake system. For example, the information ascertained may be information relating at least to an increase or a decrease in a generator braking torque, a friction force and/or a downgrade force. Such information is able to describe whether a braking torque of an on-board generator, an extreme friction force and/or a downgrade force not equal to zero is acting on the at least one wheel and/or whether the increase or decrease therein is greater than a predefined minimum difference. The predefined minimum difference may, however, also be equal to zero. As an alternative or additional measure, when ascertaining the information it may also be ascertained whether the vehicle is stationary.

In a method step S2, if the increase or decrease is greater than a predefined minimum magnitude, an assistance force, provided by a brake booster which is coupled, together with a brake input element, to a force introduction element, is altered by a force difference. The alteration of the assistance force is carried out taking account of the ascertained information in such a way that the hydraulic braking force is altered in a manner corresponding to the increase or decrease in the additional braking force.

For example, if the information ascertained is information relating at least to an increase or a decrease in a generator braking torque, a friction force and/or a downgrade force, the assistance force is altered by a force difference that compensates for the increase or decrease in the generator braking torque, the friction force and/or the downgrade force. In particular, it is possible in that manner for the assistance force of the brake booster to be changed in such a way that the sum of the hydraulic braking torque and the generator braking torque is equal to the target total braking torque. Equally, the assistance force may be specified anew in such a way that, despite an extremely low friction force, such as, for example, when driving on glare ice, it is possible to ensure the target total braking torque owing to the adaptation of the hydraulic braking torque. As an alternative or additional measure, it is also possible for the assistance force to be specified in such a way that, despite an extreme downgrade force, especially when braking on an inclined plane, the vehicle deceleration desired by the driver is maintained despite the extremely great downgrade force.

Furthermore, if the information ascertained is that the vehicle is stationary with a static friction force acting as the at least one additional braking force, the assistance force may be reduced by a force difference equal to the assistance force. In that manner, it is possible to reduce the energy consumption of the brake booster when the vehicle is stationary.

Subsequently, in a method step S3, a volume of a brake medium of the brake system is displaced between at least one accumulator chamber of at least one plunger and/or of at least one two-chamber cylinder and a volume of the brake system outside the accumulator, taking account of the information ascertained, in such a manner that a compensating force corresponding to the force difference is exerted on the brake input element. Taking account of the information ascertained may also mean that a variable derived from the information ascertained is taken into account. The volume of the brake system outside the accumulator may be understood as being a volume of at least a portion of the brake system outside the at least one accumulator chamber, which volume is connected to the accumulator chamber in such a way that filling or emptying of the accumulator chamber results in a decrease in pressure or an increase in pressure in the volume outside the accumulator. The volume outside the accumulator may also be termed a residual volume of the brake system outside the accumulator, which residual volume is able to carry out an exchange of brake medium with the accumulator chamber.

In a preferred example embodiment of the method in accordance with the present invention, the specification of the target volume displacement is performed in such a way that the compensating force compensates for an adjustment force exerted on the brake input element and resulting from the force difference of the assistance force. A possible way of carrying out method steps S1 through S3 in a simple manner is discussed in greater detail hereinafter.

The example method described above may be applied, for example, in the case of a regenerative brake system for blending of a time-varying generator braking torque. Equally, the example method described herein may be used to reduce the assistance force exerted by the brake booster when the vehicle is stationary and in that way save energy. The usability of the method described herein is not, however, limited to the examples listed.

Figure 3:
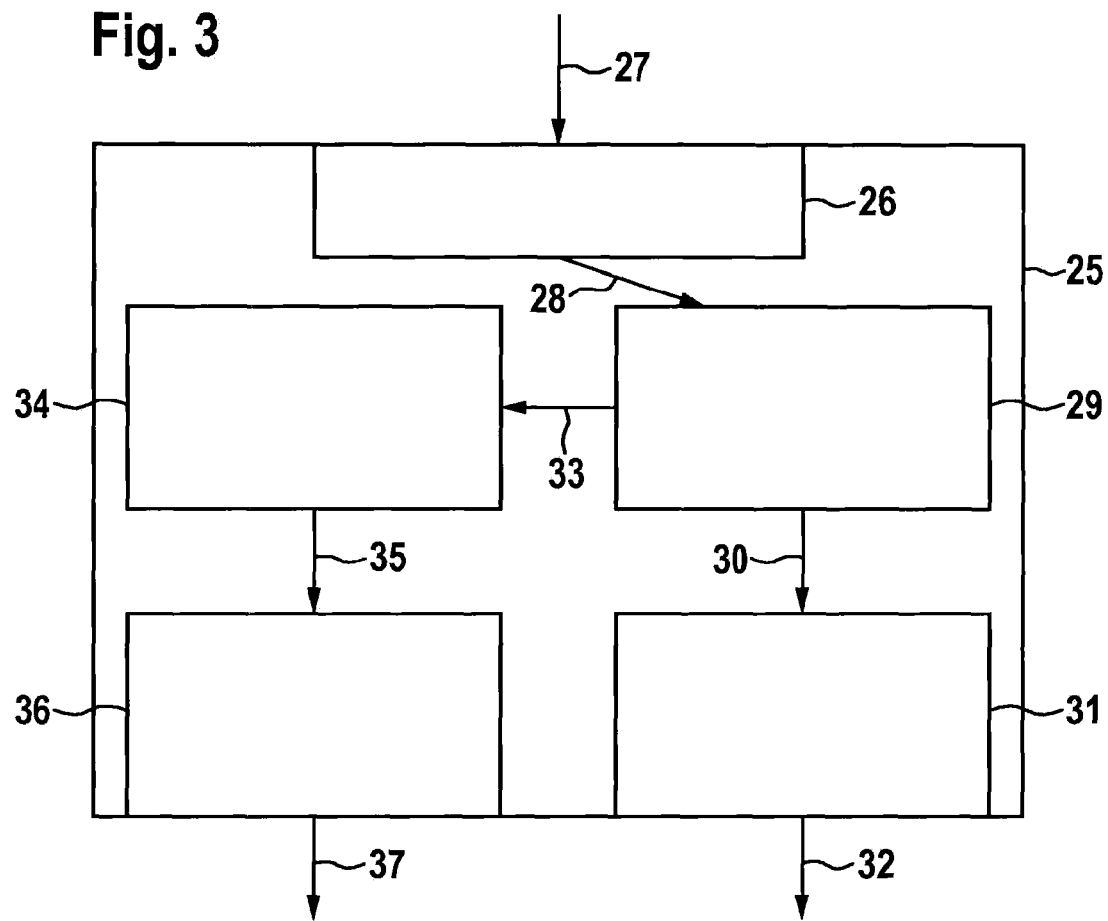
FIG. 3 shows a schematic illustration of an example embodiment of the control device.

FIG. 3 shows a schematic illustration of an example embodiment of the control device.

Control device 25 represented schematically in FIG. 3 has an input device 26 which is configured to receive information 27 relating to an increase or a decrease in at least one additional braking force exerted on at least one wheel of the vehicle in addition to a hydraulic braking force of the brake system. Input device 26 is additionally configured to provide, if the increase or decrease in the additional braking force is greater than a predefined minimum difference, at least one received signal 28 corresponding to the information.

A first evaluation device 29 of the control device 25 is configured to specify a target force alteration quantity in respect of a target alteration of an assistance force providable by a brake booster which is coupled, together with a brake input element, to a force introduction element, taking account of the at least one received signal 28. Reference is made to the examples described above and below regarding advantageous possibilities for a suitable specification of the target force alteration quantity by first evaluation device 29. First evaluation device 29 then outputs a first evaluation signal 30, corresponding to the specified target force alteration quantity, to a first actuation device 31 of the control device.

First actuation device 31 is configured to output to the brake booster (not shown) a first control signal 32 corresponding to the specified target force alteration quantity. The actuation of the brake booster by first actuation device 31 is discussed in greater detail below. In that manner it is made possible for the assistance force to be alterable by a force difference corresponding to the specified target force alteration quantity and for the hydraulic braking force to be alterable in a manner corresponding to the increase or decrease in the additional braking force.

In the case of the example embodiment illustrated, first evaluation device 29 is additionally configured to provide a second evaluation signal 33 to a second evaluation device 34 of control device 25. Second evaluation signal 33 may include at least some of the received information 27 and/or the specified target force alteration quantity. Second evaluation device 34 is configured to specify a target volume displacement quantity in respect of a target volume displacement of a brake medium of the brake system between at least one accumulator chamber of at least one plunger and/or of at least a two-chamber cylinder and a volume of the brake system outside the accumulator, taking account of second evaluation signal 33, i.e., indirectly taking account of the at least one received signal 28. Advantageous possibilities for specifying a target volume displacement quantity that compensates for the alteration of the assistance force, and hence of the total braking force, in such a way that the driver does not notice any change in the position/mode of operation of the brake input element are described below.

After the target volume displacement quantity has been specified, second evaluation device 34 outputs a third evaluation signal 35 to a second actuation device 36 of control device 25. Second actuation device 36 may be activated by third evaluation signal 35 in such a way that a second control signal 37, corresponding to the specified target volume displacement quantity, is output to at least one brake medium delivery element (not shown) of the brake system. Preferably, the at least one brake medium delivery element is actuatable by second control signal 37 in such a way that a volume of brake medium corresponding to the target volume displacement quantity is displaceable by the brake medium delivery element between the at least one accumulator chamber and the volume of the brake system outside the accumulator.

In that manner it is ensured that a volume of brake medium corresponding to the specified target volume displacement quantity is displaceable between the at least one accumulator chamber and the volume of the brake system outside the accumulator and that a compensating force corresponding to the force difference is exertable on the brake input element. In particular, with the displaced volume of brake medium it is possible to compensate for the alteration, actuated by way of first control signal 32, in the total braking force which is made up of at least the assistance force and the driver braking force and which is exerted on the adjustable component of the master brake cylinder. In this case, the displaced volume of brake medium is able to produce a compensating force that compensates for the effects of the specified new total braking force on the brake input element.

In one advantageous embodiment, second actuation device 36 may, for example, be configured to actuate by way of second control signal 37 at least one plunger motor as the at least one brake medium delivery element. As an alternative or additional measure, second actuation device 36 may also be configured to actuate by way of second control signal 37 at least one pump and/or at least one valve as the at least one brake medium delivery element, taking account of the specified target volume displacement quantity. This is preferably done in such a manner that, by way of an increase in the volume of a first chamber of the at least one two-chamber cylinder, the volume corresponding to the target volume displacement quantity is displaceable from a second chamber of the at least one two-chamber cylinder into the volume outside the accumulator. Correspondingly, a valve may also be actuatable by second actuation device 36 in such a way that a decrease in the volume of the first chamber by way of the brake medium flowing out of the first chamber through the actuated valve causes a displacement of brake medium corresponding to the target volume displacement quantity out of the volume outside the accumulator into the second chamber. Advantageous embodiments of a plunger and/or two-chamber cylinder that may be correspondingly actuated by second control signal 37 are described in greater detail below.

Figure 4:
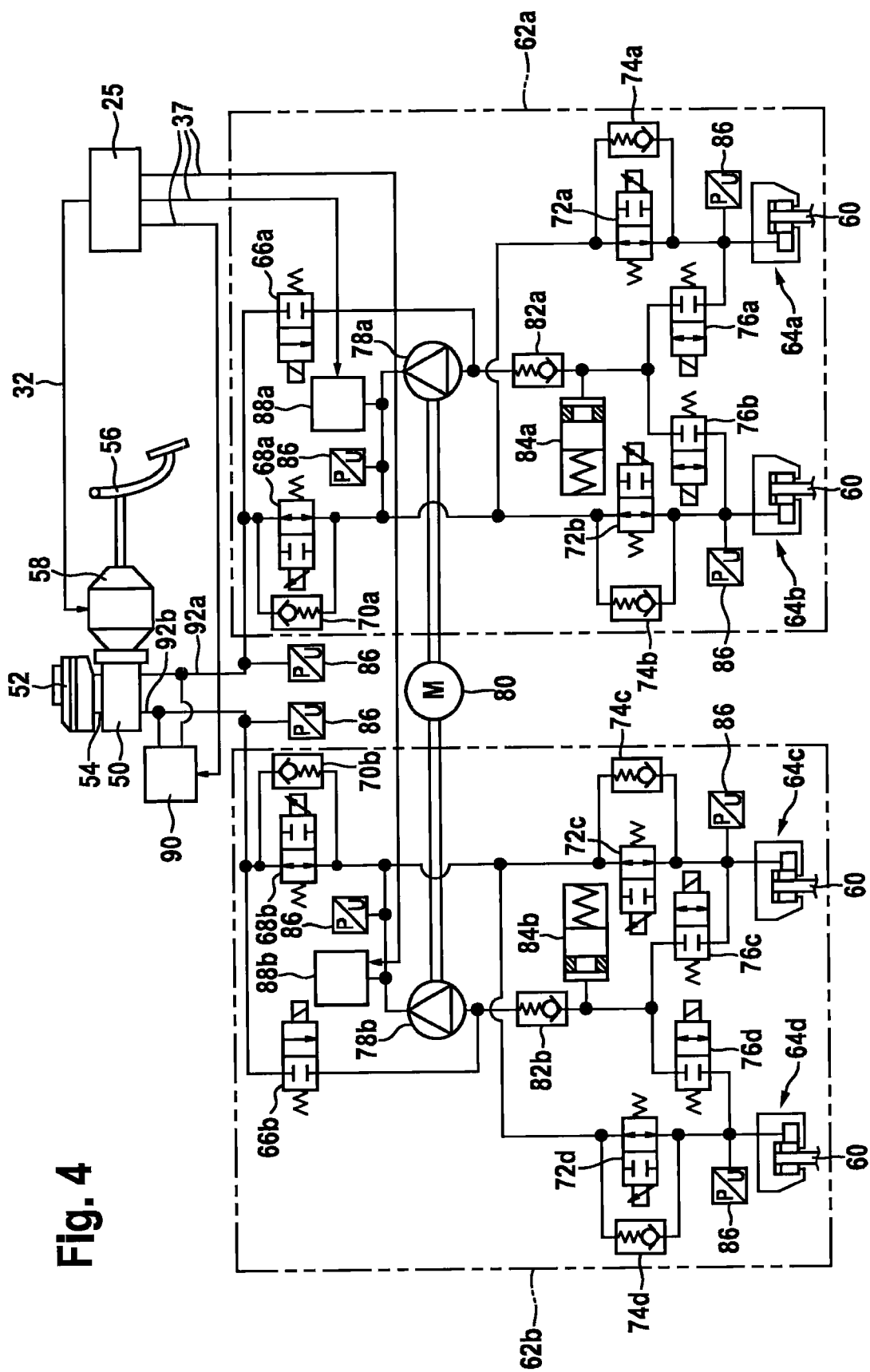
FIG. 4 shows a schematic illustration of a first example embodiment of the brake-boosted hydraulic brake system.

FIG. 4 shows a schematic illustration of a first example embodiment of the brake-boosted hydraulic brake system. The hydraulic brake system shown schematically in FIG. 4 for a vehicle includes a master brake cylinder 50 to which a brake medium reservoir 52 is connected via at least one connecting conduit 54. A brake input element 56, for example in the form of a brake pedal, is coupled to master brake cylinder 50 in such a way that a driver of the vehicle is able to bring about a pressure change in master brake cylinder 50 with the hydraulic brake system by operating brake input element 56. To assist the driver, a brake booster 58 is coupled to master brake cylinder 50 in such a way that, on operation of brake input element 56 by the driver, a total braking force made up of at least the driver braking force exerted on brake input element 56 and an assistance force provided by brake booster 58 is able to bring about a pressure change in master brake cylinder 50. Thus, the driver braking force to be applied by the driver to brake at least one wheel 60 of the vehicle may be reduced. Brake booster 58 may, for example, be in the form of an electromechanical brake booster (i-booster) or a hydraulic brake booster. Preferably, brake booster 58 is configured as a brake booster that is controllable by open-loop/closed-loop control, which permits further uses of brake booster 58.

At least one brake circuit 62a and 62b is connected to master brake cylinder 50 in such a way that a brake medium is able to flow between master brake cylinder 50 and the at least one brake circuit 62a or 62b. Such a brake circuit 62a or 62b includes at least one wheel brake cylinder 64a through 64d. The illustrated brake circuit has two brake circuits 62a and 62b each having two wheel brake cylinders 64a through 64d. It is pointed out, however, that the ability to implement the hydraulic brake system reproduced herein is not limited to a specific number of brake circuits 62a and 62b having a fixed number of wheel brake cylinders 64a through 64d. Similarly, the allocation of brake circuits 62a and 62b of the brake system to the at least four wheels 60 of the vehicle by axle, by individual wheel or diagonally is also a matter of choice. In a further embodiment, the hydraulic brake system may also have three brake circuits for an X brake circuit distribution.

In the case of the brake system illustrated in FIG. 4, the two brake circuits 62a and 62b are identical. The brake system is not, however, limited to an identical configuration of its brake circuits 62a and 62b. The equipping of each of the illustrated brake circuits 62a and 62b with one high-pressure switching valve 66a and 66b, one switch-over valve 68a and 68b with a check valve 70a and 70b arranged parallel thereto, a respective wheel inlet valve 72a through 72d with a check valve 74a through 74d arranged parallel thereto, and a wheel outlet valve 76a through 76d per wheel brake cylinder 64a through 64d, and with a pump 78a or 78b, the two pumps 78a and 78b being disposed on a common shaft of a motor 80, is shown here merely by way of example. The brake system reproduced here is not limited to the equipping of its brake circuits 62a and 62b with components 72a through 78b, or to the coupling thereof to one another that is illustrated here. The equipping of each brake circuit 62a and 62b with a further check valve 82a or 82b and an accumulator chamber 84a or 84b disposed between the suction side of a pump 78a or 78b and the relevant wheel outlet valves 76a through 76d is also to be interpreted merely as an example. Similarly, the illustrated pressure sensors 86 are to be interpreted as being optional as regards their total number per brake circuit 62a or 62b and as regards their arrangement therein, since they do not have to be present. The at least one pressure sensor 86 may, for example, be a master cylinder pressure sensor and/or a circuit pressure sensor.

Each of the illustrated brake circuits 62a and 62b has its own plunger 88a or 88b which is disposed adjacent to the pressure side of the associated pump 78a or 78b. A further plunger 90 has respective flow apertures to the two feed lines 92a and 92b of the two brake circuits 62a and 62b, which feed lines 92a and 92b are coupled to master brake cylinder 50. It is pointed out that the equipping of the brake system reproduced here is not limited to a specific number of plungers 88a, 88b and 90 or to their arrangement on or in the at least one brake circuit 62a or 62b. Each of plungers 88a, 88b and 90 may be regarded as a brake medium delivery element having its own inbuilt accumulator volume of the brake system, with which a brake medium volume is displaceable between the at least one accumulator volume of plunger 88a, 88b or 90 and the volume of the at least one associated brake circuit 62a and 62b outside the accumulator. Two advantageous exemplary embodiments of plungers 88a, 88b and 90 will be described below.

FIG. 5 shows a schematic illustration of a first exemplary embodiment of a plunger of the hydraulic brake system.

Plunger 88a reproduced schematically in FIG. 5 has a plunger accumulator chamber 100 and a plunger motor 104 which is coupled by way of a coupling 106 to an adjustable wall component 102 of plunger accumulator chamber 100. Coupling 106 between plunger motor 104 and adjustable wall component 102 allows the volume of plunger accumulator chamber 100, or rather the quantity of brake medium introduced into plunger accumulator chamber 100, to be controlled.

For additional control of a flow of brake medium between plunger accumulator chamber 100 and a (schematically and only partially reproduced) volume of brake circuit 62a outside the accumulator, a valve unit 108 is disposed at the inlet side of plunger 88a. Valve unit 108 may, for example, be in the form of a check valve, a switching valve or a regulating valve. Plunger 88a and valve unit 108 may also be in one piece. The actuation of plunger 88a and valve unit 108 will be discussed in greater detail below.

Thus, a hydraulic pressure in master brake cylinder 50 (initial pressure) and/or a position of adjustable component 21 of master brake cylinder 50 is controllable not only by way of a total braking force Fg, resulting from at least a driver braking force Ff and/or an assistance force Fu of the brake booster, but also by way of operation of plunger motor 104 and valve unit 108. Thus, there is the possibility of altering the hydraulic pressure in master brake cylinder 50 (initial pressure) and/or the adjustment of adjustable component 21 of master brake cylinder 50 independently of a driver braking force Ff applied by the driver and/or of an assistance force Fu provided by the brake booster. Advantages gained by this are discussed in greater detail below.

FIG. 6 shows a schematic illustration of a second exemplary embodiment of a plunger of the hydraulic brake system.

Plunger 88a' is configured in such a manner, owing to a self-inhibiting coupling 110 of plunger motor 104 to adjustable wall component 102 of plunger accumulator chamber 100, that undesired filling of plunger accumulator chamber 100 from the brake system, or unwanted pushing-back of plunger 88a', is prevented at least up to a relevant pressure. One may also refer to this as plunger 88a' being of a self-inhibiting configuration. Such a plunger 88a' also affords the advantages mentioned below.

Instead of or in addition to the foregoing examples, other exemplary embodiments of a plunger, for example with additional gearing, may be used.

The examples of plungers 88a and 88a' described here may be integrated in the brake system illustrated in FIG. 4 in a simple manner. A brake-boosted hydraulic brake system of that kind may additionally be equipped with an ABS unit, an ESP unit, an EHB system and/or a brake regulation system of a different configuration. Owing to the hydraulic connection between the at least one plunger 88a, 88b and/or 90 and master brake cylinder 50, as described in greater detail below the plunger may be used to improve the operating comfort of brake input element 56 for the driver.

The hydraulic brake system of FIG. 4 also includes control device 25 described above. By way of first control signal 32, brake booster 58 is preferably actuatable in such a way that, when information relating to an additional braking force exerted on the at least one wheel 60 in addition to the hydraulic braking torque of the brake system is received, the assistance force provided by brake booster 58 is altered by way of the comparison quantity in such a way that the total braking force made up of at least the assistance force and the driver braking force produces a changed hydraulic braking torque in the at least one wheel brake cylinder 64 through 64d, which together with the additional braking force results in a preferred target total braking torque. For example, for that purpose a force and/or travel sensor may also be disposed on brake input element 56, which sensor additionally supplies a driver braking input signal to control device 25. In that case, control device 25 is additionally configured in such a way that, when the target force alteration quantity is being specified, it also takes account of the driver braking input signal and outputs to brake booster 58 a first control signal 32 adapted to the operation of brake input element 56.

By way of second control signal 37, plungers 88a, 88b and 90 may be actuated in such a way that a pressure change is built up in master brake cylinder 50, which results in brake input element 56 remaining in a preferred position despite a significant change in the assistance force. The actuation of plungers 88a, 88b and 90 by second control signal 37 may be carried out taking account of the pressure-volume characteristic curve of brake circuits 62a and 62b and additionally taking account of the quantities that are relevant in respect of the coupling of brake input element 56 to brake booster 58 and to the master brake cylinder.

Conventionally, a change in the assistance force provided by brake booster 58 is sometimes associated with a "pulling" of brake input element 56, for example the brake pedal. When the driver brakes, this is often found to be irritating, since the characteristics of the brake input element have changed accordingly. For example, on touching the brake pedal, the driver notices an unexpected brake pedal position in this case. In the case of the technology according to the example embodiment of the present invention described herein, however, a compensating force is provided by way of the compensating function of plungers 88a, 88b and 90, as will be described in greater detail hereinafter, which is able to cause brake input element 56 to remain in a preferred (standard) position despite an alteration of the assistance force.

The technology according to the present invention of the brake system of FIG. 4 is described below with reference to an example of use for blending regenerative braking. It is pointed out, however, that the technology according to the present invention is correspondingly also possible for adaptation of the hydraulic braking torque to a lower friction at at least one of wheels 60, to an extremely high downgrade force and/or to the vehicle being currently stationary.

In the case of the example of use described here, a generator exerts an additional generator braking torque on at least one of wheels 60, preferably on one axle of the vehicle. The generator braking torque may vary with time, for example owing to its dependence on the current speed of the vehicle and/or its dependence on a state of charge of a vehicle battery which is chargeable via the generator. For simplicity, it may be assumed that the current vehicle deceleration results from the hydraulic braking torque of the brake-boosted hydraulic brake system and from the generator braking torque.

By way of first control signal 32 of control device 25, the assistance force of brake booster 58 may be adapted in such a way that the vehicle deceleration corresponds to an ascertainable driver braking input of the driver. For example, for that purpose, in the case of an increase in the generator braking torque, especially when the generator is being blended in, the assistance force of brake booster 58 is reduced in such a way that the vehicle deceleration remains constant in the case of uniform operation of brake input element 56 by the driver. Correspondingly, in the case of a reduction in the generator braking torque, such as, for example, when the generator is being blended out, the assistance force of brake booster 58 may be increased, so that, in particular, in the case of constant operation of brake input element 56, the desired vehicle deceleration is maintained. Correspondingly, the assistance force of the brake booster may also be adapted to the generator braking torque in the case of non-uniform operation of brake input element 56 by the driver, in such a way that the current vehicle deceleration corresponds to the ascertainable driver braking input.

If, for example, in the case of the generator being blended in, the assistance force of brake booster 58 is reduced, the pressure in master brake cylinder 50 and the two brake circuits 62a and 62b becomes lower, however, than the driver would expect based on the force exerted on brake input element 56. The volume displaced into the wheel brake calipers of wheel brake cylinders 64a through 64d is also lower in this case owing to the reduced total braking force. The deviation of the displaced volume corresponds in this case to the pV characteristic curves of wheel brake cylinders 64a through 64d. This means that, conventionally, a greater volume in comparison with the driver braking force remains in master brake cylinder 50, and the travel of the pedal is thus shorter owing to the reaction force exerted on brake input element 56 by master brake cylinder 50. The driver frequently perceives this as the brake input element being in an unfamiliarly raised position.

By actuation of plungers 88a, 88b and 90 by way of second control signal 37, however, an additional volume of brake medium may be displaced into the accumulator chamber of plungers 88a, 88b and 90. This causes a "pulling-inward" or "falling-inward" of brake input element 56. The travel of the pedal is thus matched to the driver braking force. This matching of the pedal travel and the position of brake input element 56 is associated with additional operating comfort for the driver.

The example method steps described in the two foregoing paragraphs may also be applied correspondingly to an increase in the assistance force of brake booster 58 brought about by a decrease in the generator braking torque. With appropriate adjustment of control signals 32 and 37, that is to say, of the alteration of the assistance force and the displacement of the brake medium volume between the at least one accumulator chamber and the volume outside the accumulator, it is possible to set what is for the driver a neutral force-travel behavior of brake input element 56 despite a change in the hydraulic braking torque/hydraulic brake pressure in the brake system.

By virtue of the use of the at least one plunger 88a, 88b and 90, the displacement of brake medium which is carried out in that case involves minimum noise nuisance. In particular, a "soft" displacement of the brake medium is thus possible, which the driver does not notice either in the way of a "juddering" or in the way of a "kickback" of brake input element 56. The blending of the time-varying generator braking torque therefore has no repercussions on the operating comfort of brake input element 56 for the driver.

If the at least one plunger 88a, 88b and 90 has a valve connected upstream thereof, that valve may advantageously be configured with a check valve in such a way that delivery of the plunger volume into brake circuit 62a or 62b is also possible when a main seat of the valve is closed. Thus, it is still possible for the volume to be conveyed back from the at least one plunger 88a, 88b and 90 into the associated brake circuit 62a or 62b in the event of failure of the valve, for example due to a defective permanent power supply, which causes closing to occur, or in the event of jamming of the valve. Potential under-braking owing to an "absent" volume may therefore be prevented.

Figure 7:
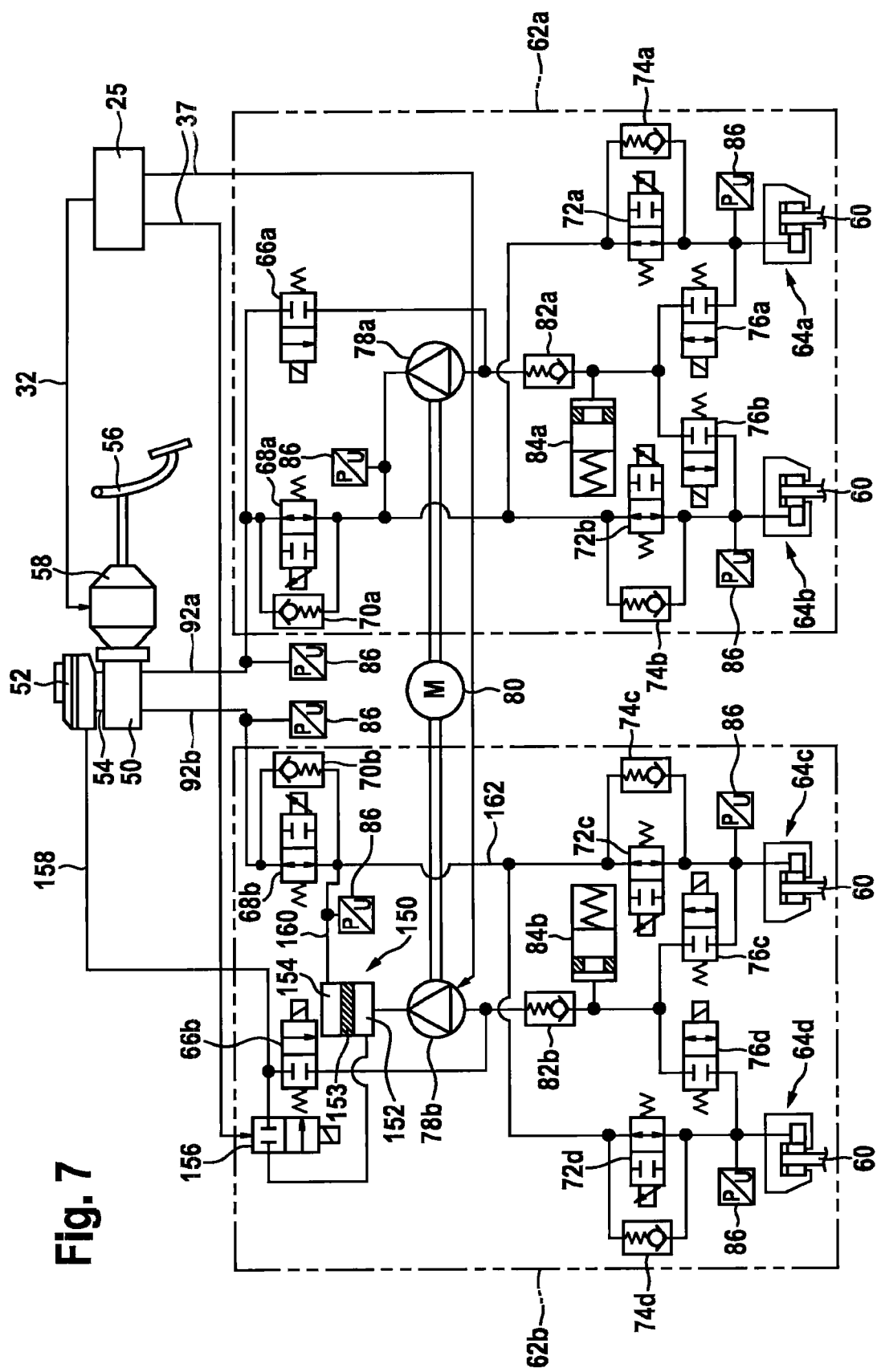
FIG. 7 shows a schematic illustration of a second embodiment of the brake-boosted hydraulic brake system.

FIG. 7 shows a schematic illustration of a second embodiment of the brake-boosted hydraulic brake system.

The brake system reproduced schematically in FIG. 7 has components 50 through 86 and 92a and 92b described above. Second brake circuit 62b is equipped, however, with a two-chamber cylinder 150 in place of a plunger. In a development of the illustrated brake system, first brake circuit 62a also may be equipped with such a two-chamber cylinder.

Two-chamber cylinder 150 includes a first chamber 152 and a second chamber 154. A separating wall between the two chambers 152 and 154 includes a displaceable separating element 153, so that a total volume of the two chambers 152 and 154 remains constant on increasing/reducing the size of one of the two chambers 152 and 154. First chamber 152 is oriented toward a pressure side of pump 78b of second brake circuit 62b. By operating pump 78b, a volume of brake medium may thus be pumped into first chamber 152 of two-chamber cylinder 150. Furthermore, a port of first chamber 152 is connected via a valve 156 to a reservoir line 158 which leads into brake medium reservoir 52. Thus, when valve 156 is in an open state, a volume of brake medium is able to flow out of first chamber 152 via reservoir line 158 into brake medium reservoir 52. Second chamber 154 of two-chamber cylinder 150 is coupled via an intermediate line 160 to a line 162 which, by way of switch-over valve 68b, connects wheel inlet valves 72a and 72d to supply line 92b. Thus, when switch-over valve 68b is open and when wheel inlet valves 72a and 72d are closed, a volume of brake medium may be displaced between second chamber 154 of two-chamber cylinder 150 and master brake cylinder 50.

There follows a description of the advantageous cooperation of control device 25, two-chamber cylinder 150, valve 156 and pump 78b for the purpose of blending a time-varying generator braking torque. It will be appreciated that components 25, 78b, 150 and 156 may also be used to compensate for a low friction force on at least one of wheels 60 or to compensate for an extreme downgrade force and/or to reduce energy consumption of brake booster 58 when the vehicle is stationary.

In the case of a decreasing generator braking torque, a target total braking torque specified by the driver may be maintained by brake booster 58 being actuated by way of first control signal 32 in such a way that a greater assistance force is provided. Accordingly, the total braking force made up of assistance force and driver braking force increases also in the case of constant operation of brake input element 56 by the driver. Owing to the greater total braking force, a greater pressure builds up in master brake cylinder 50. That greater pressure produces a higher restoring force on brake input element 56. To avoid this, a pressure reduction may be brought about in the master brake cylinder by an absorption of volume. For that purpose, by opening valve 156, a hydraulic connection may be opened between brake medium reservoir 52 and first chamber 152 of two-chamber cylinder 150. The brake medium is thus able to flow away from first chamber 152 via the opened hydraulic connection into brake medium reservoir 52. Owing to the resulting pressure reduction in first chamber 152, displacement of separating element 153 between the two chambers 152 and 154 takes place. The second chamber thus absorbs a certain volume of brake medium from the volume of second brake circuit 62b outside the accumulator.

In the case of a decrease in the generator braking torque, the assistance force may be increased correspondingly by way of first control signal 32. If one wishes to obtain an additional buildup of pressure or volume in the brake system by way of second control signal 37, then, by way of a suitable second control signal 37 output to pump 78b, it is possible for volume to be sucked out of brake medium reservoir 53. Such a suction of volume from brake medium reservoir 52 is especially guaranteed if a corresponding second control signal 37 (not shown) for opening is also output to the high-pressure switching valve. As an alternative to an absorption of volume from brake medium reservoir 52, an absorption of volume from accumulator chamber 84b may also be implemented.

By pumping of a volume of brake medium into first chamber 152, the pressure therein is correspondingly increased. By the increase in pressure caused, separating element 153 between chambers 152 and 154, for example a piston, is displaced. That results in a buildup of pressure in second chamber 154, which causes a displacement of volume from second chamber 154 into the volume outside the accumulator.

A considerable advantage of the technology according to the present invention described herein is that the pulsations of the pump are reduced/minimized by two-chamber cylinder 150 which acts as a damper. Since brake booster 58, especially a brake booster 58 controllable by closed-loop or open-loop control, is mainly used for the pressure buildup dynamics, the dynamics of a two-chamber cylinder 150 are adequate for this possible application.

FIGS. 8A through 8D show schematic illustrations of a coupling mechanism of a brake system to illustrate a second embodiment of the method.

By virtue of the example method described below for altering hydraulic braking force in a hydraulic brake system having a brake booster 14 in conjunction with a hydraulic chamber of a plunger and/or of a two-chamber cylinder, a force-travel-neutral blending of and/or compensation for an additional braking torque is possible while ensuring good operating comfort of the at least one brake input element of the associated brake system.

The illustrated coupling mechanism includes components 10 through 22 described above. It is pointed out, however, that the example of the method is not limited to such a coupling mechanism. For example, instead of using reaction disk 18, a different force introduction element may be used to add driver braking force Ff and assistance force Fu to total braking force Fg. Total braking force Fg may include in this case at least one additional force, which will not be considered hereinafter. Furthermore, the example method is not limited to a specific embodiment of a brake circuit filled with a braking gas or a braking liquid. For example, various alternative possibilities are conceivable regarding volume management in the brake system.

Brake booster 14 may, for example, be an electromechanical brake booster, a vacuum brake booster and/or a hydraulic brake booster. It will be appreciated that it is also possible to employ a plurality of brake boosters 14 to provide assistance force Fu. Brake booster 14 is preferably configured for brake assistance that is adjustable or is controllable by closed-loop control. Preferably, brake booster 14 is configured to determine assistance force Fu as a function of driver braking force Ff and/or of first adjustment travel s1. It will therefore be readily apparent to one skilled in the art that the practicability of the method is not limited to a specific type of brake booster 14.

Figure 8A:
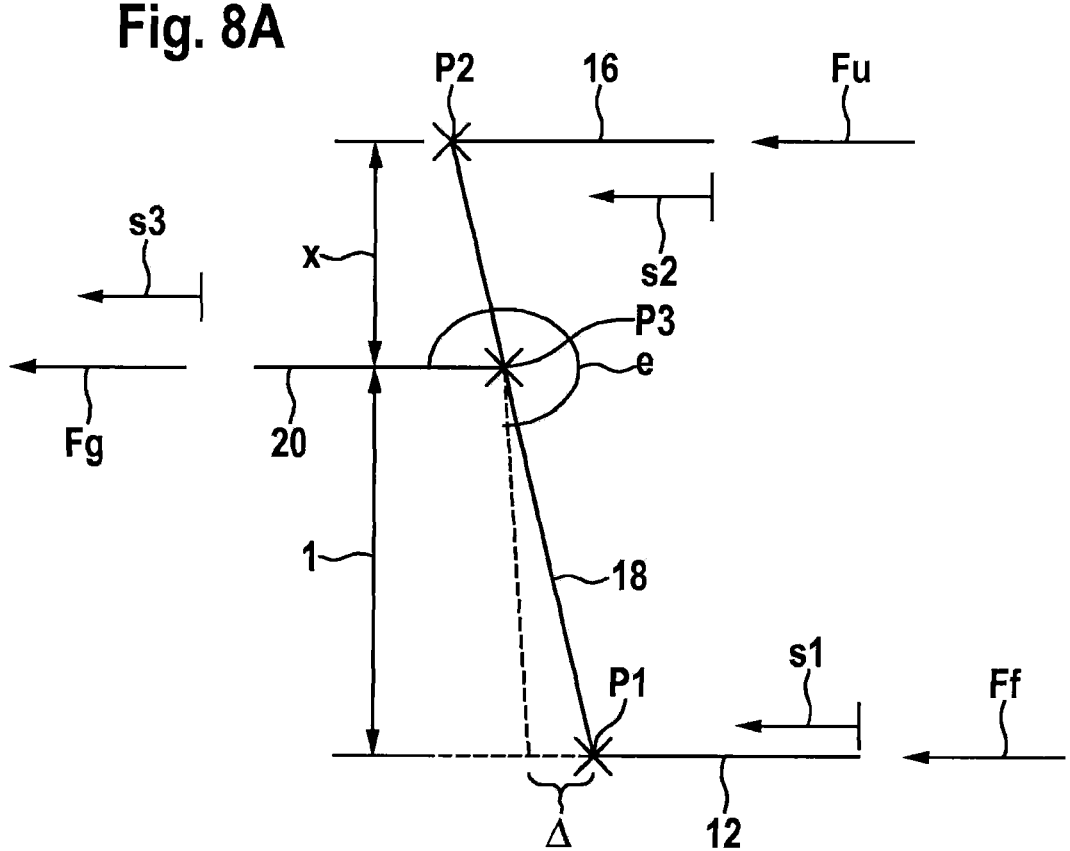
FIGS. 8A to 8D show schematic illustrations of a coupling mechanism of a brake system to illustrate a second embodiment of the method.

FIG. 8A shows an equivalent model to illustrate deformation of reaction disk 18 at a driver braking force of Ff≠0 and at an assistance force of Fu≠0. Points P1 through P3 correspond to areas on reaction disk 18. If point P1 is adjusted relative to point P3 by a bending quantity A of reaction disk 18, this gives:

$$s1 = s3 + \Delta \quad \text{(Eq. 1)}$$

Adjustment of output piston 20 by third adjustment travel s3 thus causes as a rule an adjustment of input piston 12 and of brake input element 10 by first adjustment travel s1.

The equilibrium of torques at reaction disk 18 provides:

$$\Delta * e = Ff - x * Fu \quad \text{(Eq. 2)}$$

Substitution of equation (Eq. 2) into equation (Eq. 1) therefore gives:

$$s1 = s3 + (Ff - x * Fu)/e \quad \text{(Eq. 3)}$$

The relation corresponding to equation (Eq. 3) between first adjustment travel s1 of brake input element 10 and third adjustment travel s3 of output piston 20 often leads conventionally to an impairment of the operating comfort of brake input element 10. For example, owing to the relation, a pressure change in master brake cylinder 22 and/or in the brake circuit may lead to a movement of brake input element 10 which is irritating for the driver. That disadvantage may be prevented by the example method described below.

By way of example it is assumed that the method described herein is being used for blending of a generator braking torque. The applicability of the method is not, however, limited to that embodiment example.

Figure 8B:
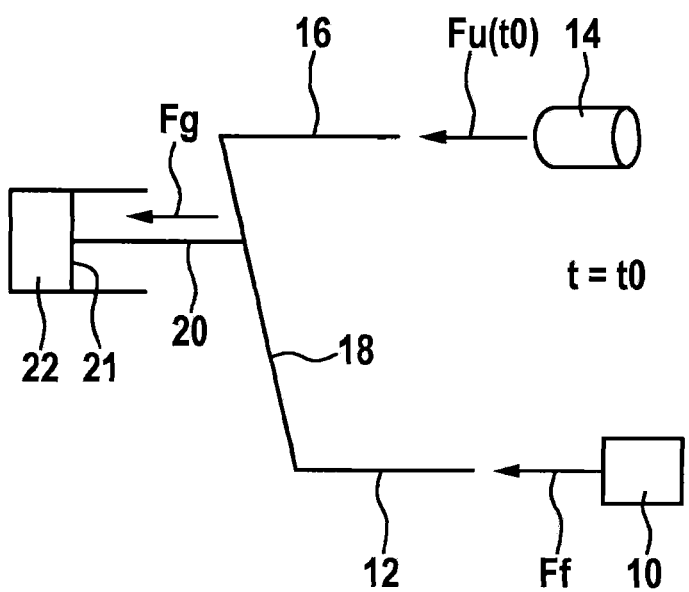

FIG. 8B shows the coupling mechanism with components 10 through 22 at a time t=t0 before the method commences. For the purpose of illustration, it is assumed in the discussion which follows that, at time t0 and during the entire method, the driver applies a time-constant driver braking force Ff and a time-constant first adjustment travel s1 to brake input element 10. Correspondingly, at time t0 a time-constant assistance force Fu and a time-constant second adjustment travel s2 are provided by brake booster 14. (Assistance force Fu provided by brake booster 14 is generally known without an additional measuring step that is to be carried out). The method described hereinafter is not, however, limited to a time-constant operation of brake input element 10 by the driver.

Thus, a constant hydraulic braking torque Mh proportional to total braking force Fg acts on at least one wheel associated with the brake circuit, hydraulic braking torque Mh being given by a brake pressure p (corresponding to total braking force Fg) and a constant C:

$$Mh = C * p \quad \text{(Eq. 4)}$$

At a time t>t0, an additional braking torque Mz is activated. Additional braking torque Mz is, for example, a generator braking torque. Instead of a generator braking torque, a different additional braking torque Mz may, however, also be blended by the method described.

Total braking torque Mg(t>t0) is thus composed of hydraulic braking torque Mh(t>t0) and additional braking torque Mz(t>t0):

$$Mg(t>t0) = Mh(t>t0) + Mz(t>t0). \quad \text{(Eq. 5)}$$

The example method described hereinafter may also be carried out if, for example, a generator braking torque is being reduced and Mz(t>t0) is negative.

Despite additional braking torque Mz(t>t0)≠0, it is desirable, when operation of brake input element 10 by the driver is constant, to maintain a total braking torque of Mg(t>t0) = Mg(t0). To do this, method steps S1 through S3 already described above are carried out.

For example, in method step S2, a pressure difference Δp by which brake pressure p in the wheel brake cylinders may be altered so that a constant total braking torque of Mg(t>t0) = Mg(t0) is maintained is directly or indirectly ascertained. For example, the following may apply for pressure difference Δp:

$$\Delta p = Mz(t>t0)/C \quad \text{(Eq. 6)}$$

The desired maintenance of the constant total braking torque Mg(t>t0) is ensured provided that brake pressure p is altered by pressure difference Δp by way of the initial pressure in master brake cylinder 22. In this case, it is advantageous to alter the initial pressure by alteration of total braking force Fg by a target braking force alteration ΔFg, using $$\Delta Fg = A * Mz(t>t0)/C, \quad \text{(Eq. 7)}$$

where A corresponds to an area of master brake cylinder 22.

Since alteration of driver braking force Ff in order to bring about target braking force alteration ΔFg is not desirable, assistance force Fu provided by brake booster 14 is changed in accordance with target braking force alteration ΔFg. Thus, the following applies for a target assistance force alteration ΔFu:

$$\Delta Fu = A * Mz(t>t0)/C. \quad \text{(Eq. 8)}$$

Figure 8C:
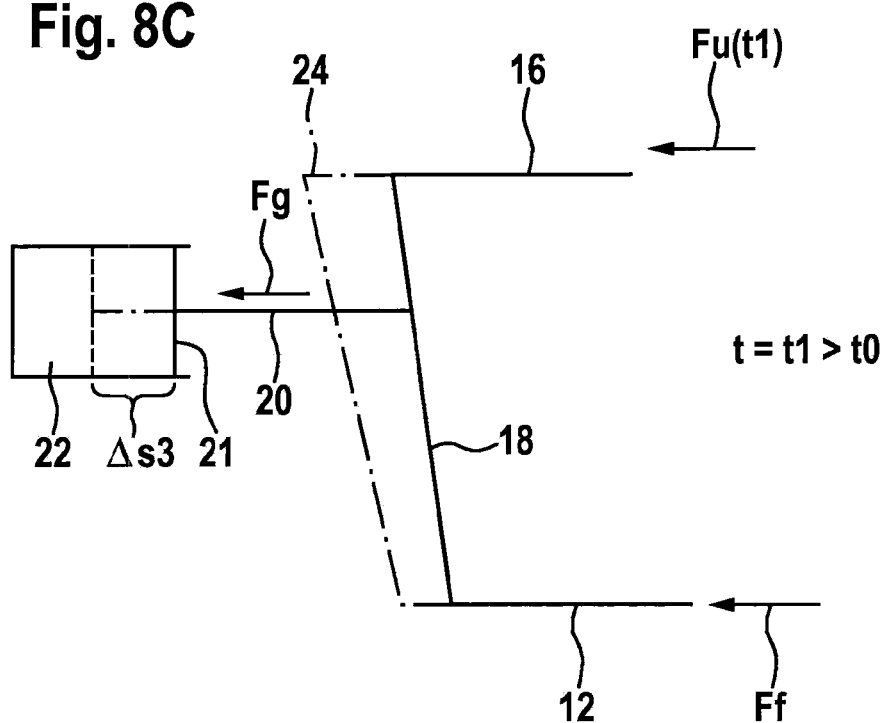

FIG. 8C shows the coupling mechanism after method steps S1 and S2 have been performed, at a time t1>t0. Thus, at time t1, brake pressure p is preferably set in such a way that total braking torque Mg(t1) applied to at least one wheel at time t1 corresponds to total braking torque Mg(t0) at time to, that is to say, Mg(t1)=Mg(t0).

In accordance with the time-constant driver braking force Ff, an even braking of the vehicle is maintained. Assistance force Fu(t1) at time t1 corresponds to a difference in assistance force Fu(t0) at time t0 and target assistance force alteration ΔFu. By a lowering of the initial pressure, brake pressure p is automatically reduced in all the wheel brake cylinders of the brake system. Thus, the lowering of the initial pressure also makes itself felt at wheels that are not connected to the generator. In that manner it is possible to blend a greater generator torque.

As is clear from the above description, closed-loop control of the hydraulic brake pressure/hydraulic braking force with the aid of brake booster 14 is simple to perform. As becomes clear from a consideration of FIG. 8C, however, such an alteration of the hydraulic brake pressure/hydraulic braking force is conventionally also associated with a change in volume in master brake cylinder 22 and/or with a deformation of reaction disk 18. (For illustration, the "shape" of reaction disk 18 at time t0 is drawn as a dot-dash line 24 in the equivalent model of FIGS. 8C and 8D. It is advantageous for that effect also to be taken into account in the further method steps.) In order that first adjustment travel s1, and hence the position of brake input element 10, remains unchanged, however, it is advantageous for the following to apply:

$$s1(t2)=s1(t0) \quad \text{(Eq. 9)}$$

This may be accomplished in method steps S4 and S5 by regulation of the volume in the brake system as described below, which may be achieved using a plunger and/or a two-chamber cylinder. For example, in this manner it is possible to prevent a kickback of brake input element 10.

The alteration of the volume in master brake cylinder 22 may be easily read off or calculated from the pressure-force characteristic curve, the so-called pV characteristic curve, of the wheels. (The pV characteristic curve of the individual wheels can also be estimated well.) In that manner it is possible to derive a relationship between the volume alteration $V(t0 \rightarrow t1)$ and the displacement $\Delta s3$ of the adjustable component of master brake cylinder 22 (see FIG. 8C), where:

$$\Delta s3 = V(t0 \rightarrow t1)/A \quad \text{(Eq. 10)}$$

In one advantageous embodiment of the method described herein, it is possible, however, for first adjustment travel s1 of brake input element 10 to be kept constant despite that displacement $\Delta s3$ of output piston 20 caused by the volume alteration $V(t0 \rightarrow t1)$. This is done by taking account of equation (Eq. 3) already derived above. In method step S3, there is specified, for example, as a target volume displacement quantity, a target volume alteration/target volume displacement of brake medium between the at least one accumulator chamber of the at least one plunger and/or of the at least one two-chamber cylinder and the volume outside the accumulator. Preferably, target volume alteration $\Delta V$ is specified on the basis of preceding equations (Eq. 1) through (Eq. 3) in such a manner that:

$$\Delta V = A^*(\Delta s3 + x^* \Delta Fu/C) \quad \text{(Eq. 11)}$$

Thus, when target volume alteration $\Delta V$ is being specified, it is advantageously possible to take into account the fact that the alteration of the assistance force corresponding to desired target assistance force alteration $\Delta Fu$ causes an alteration of the volume absorption of the brake system by $V(t0 \rightarrow t1)$ or $\Delta s3$, and (owing to the elasticity e of reaction disk 18) produces a deformation of reaction disk 18. The two effects are in opposite directions, which is why, for example, a positive $\Delta s3$ results in a negative term ($x^* \Delta Fu/C$).

In order to comply with equation (Eq. 9), target volume alteration $\Delta V$ derived in equation (Eq. 11) is carried out by a suitable actuation of the at least one brake medium delivery element of the brake system in method step S3. For example, in order to keep not only the deceleration but also the pedal travel constant at the same driver braking force Ff, the target volume alteration $\Delta V$ specified in equation (Eq. 11) is displaced between the at least one accumulator chamber of the at least one plunger and/or of the at least one two-chamber cylinder and the volume of the brake system outside the accumulator.

Figure 8D:
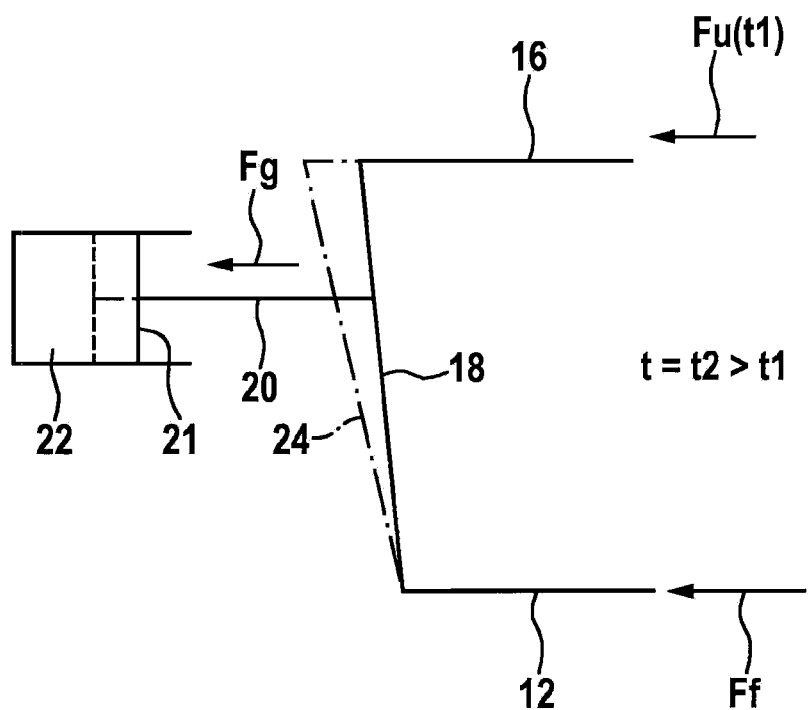

FIG. 8D shows the coupling mechanism at time t2 after target volume alteration $\Delta V$ has been carried out by a component of the brake system suitable for redistributing brake medium in the brake system. In that case, adjustment travel s1(t1) at time t2 preferably corresponds to adjustment travel s1(t0) specified at time t0, that is to say, s1(t2)=s1(t0).

The example method steps described in the foregoing paragraphs may be carried out so quickly that the time interval between times t0 and t2 tends to zero. Accordingly, first adjustment travel s1 remains constant in time. Thus, by carrying out the described example method, at a time-constant driver braking force Ff, a time-constant first adjustment travel s1 is also ensured despite an additional braking torque Mz not equal to zero. The driver therefore notices nothing of the activation of additional braking force Mz. The method described in the foregoing paragraphs thus ensures improved driving comfort for the driver.

Equally, in the case of the example method described herein, the operation of keeping the deceleration of the vehicle constant and the operation of keeping first adjustment travel s1 constant are decoupled and carried out independently of each other.

The percentage of the possible regeneration ability with the aid of the example method described above is given by the boosting factor $\gamma$ of brake booster 14. The maximum regeneration ability is reached when assistance force Fu is equal to zero and only driver braking force Ff is applied as total braking force Fg in master brake cylinder 22. Thus, total braking force Fg may be reduced by at most a factor of $\gamma/(\gamma+1)$. If brake booster boosts, for example, by at most a factor of $\gamma=4$, then the percentage of the maximum possible regeneration ability is 80%.

An optional extension of the example method for a 100% regeneration is described below:

If a degree of regeneration that may be described as the limit degree of regeneration has been reached, at which the assistance force becomes zero and the hydraulic braking torque is applied solely by driver braking force Ff, then the hydraulic braking force reduction may be set at the wheels with a closed-loop control procedure as used, for example, in an ABS/ESP unit. This is done by closing the inlet valves and relieving the wheel pressure by way of the outlet valves, in which case, for example, the accumulator chamber of the ABS/ESP system is filled. If the inlet valves are closed, the volume in the brake system between the inlet valves and master brake cylinder 22 does not change. The pressure in master brake cylinder 22 therefore remains constant. Accordingly, no change occurs in first adjustment travel s1. The driver therefore notices nothing of the example method steps described below by way of a reaction of the brake input element. The method steps described in this paragraph may, of course, also be carried out before the limit degree of regeneration is reached, especially when the limit degree of regeneration has almost been reached. For example, closing of the inlet valve may already take place before the limit degree of regeneration is reached, so that a residual force of the brake booster continues to be exerted.

As an alternative to the closing of the inlet valves, instead of this harsh transition being performed, a soft transition may also be performed at the limit degree of regeneration. In that case, the inlet valves are already activated before the limit degree of regeneration is reached, in a regulated operating mode known as $\Delta p$ regulation. In that operating mode it is possible, in particular, for differential pressures and volume flows to be comfortably regulated/controlled comfortably. Thus, the reaction experienced by the driver through the pedal or in the way of noise may be markedly reduced. It is only when the limit degree of regeneration is reached that the at least one inlet valve is completely closed in this case in order to keep first adjustment travel s1 constant.

For a pressure buildup with closed inlet valves, the following example method steps may be performed: at the beginning, a specific volume is enclosed between master brake cylinder 22 and the inlet valves under a specific pressure. If, following closing of the inlet valves, the wheel pressure is further reduced, for example in order to blend a further generator braking torque, then the pressure enclosed between the master brake cylinder and the inlet valves is greater than the wheel pressure. In that case, it is advantageous to control/regulate the system in such a way that the amount of the volume from the master brake cylinder to the inlet valves does not change, since in that case a reaction on the pedal travel is prevented. This means actuating the return pump and/or inlet and outlet valves on subsequent pressure buildup in such a way that the volume so displaced contributes merely to pressure buildup in the wheel. This may be done in such a way that the pressure buildup corresponds to the reduction of the generator torque. This is made easier by the enclosed pressure between master brake cylinder 22 and the inlet valves being greater than the wheel pressure and therefore by volume being easily displaceable to the wheel brake cylinders via the inlet valve or with the aid of the Δp regulation.

Brake booster 14 or 58 mentioned herein is preferably a brake booster controllable by open-loop and/or closed-loop control. The assistance force of the brake booster may therefore be set both in dependence on the driver braking force and independently of the driver braking force. Coupling of the brake booster, together with input piston 12, to a force introduction element, for example reaction disk 18 illustrated, means acting on the force introduction element with a force. A mechanical coupling in the sense of a connection of the force introduction element to the brake booster and to input piston 12 is not imperative. It is also possible for there to be an idle travel between the force introduction element and input piston 12, for example, especially at the commencement of operation of a brake pedal.

What is claimed is:

1. A method for operating a brake-boosted hydraulic brake system of a vehicle, comprising:
   ascertaining information relating to an increase or a decrease in at least one additional braking force exerted on at least one wheel of the vehicle;
   altering, by changing a force difference exerted in a brake booster, an assistance force that supplements a driver braking force, wherein the force difference takes into account the ascertained information such that a hydraulic braking force corresponds with the increase or the decrease in the at least one additional braking force; and
   in order to account for the altered assistance force, exerting a compensating force corresponding to the force difference on a brake input element of the brake booster, by displacing a volume of a brake medium of the brake system one of: (i) from at least one chamber of an accumulator to a volume of the brake system outside of the accumulator and (ii) from the volume of the brake system outside of the accumulator to the at least one chamber of the accumulator,
   wherein the accumulator chamber includes at least one of: i) at least one plunger, and ii) at least one two-chamber cylinder, and
   wherein the at least one additional braking force is a force applied in addition to a hydraulic braking force of the brake system.

2. The method as recited in claim 1, wherein the information ascertained is information relating at least to an increase or a decrease in at least one of a generator braking torque, a friction force, and a downgrade force, and wherein the assistance force is altered by a force difference that compensates for the increase or decrease in the at least one of the generator braking torque, the friction force, and the downgrade force.

3. The method as recited in claim 1, wherein the information ascertained is whether the vehicle is stationary, and wherein, if the vehicle is stationary with a static friction force acting as the at least one additional braking force, the assistance force is reduced by a force difference equal to the assistance force.

4. A control device for a brake-boosted hydraulic brake system of a vehicle, comprising:
   an input device configured to receive information relating to an increase or a decrease in at least one additional braking force exerted on at least one wheel of the vehicle and to send at least one received signal corresponding to the received information;
   a first evaluation device configured to specify a target force alteration quantity exerted in a brake booster by performing a target alteration of an assistance force that supplements a driver braking force, wherein the target force alteration takes into account the at least one received signal;
   a first actuation device controlling the brake booster in a manner corresponding to the specified target force alteration quantity, so that the assistance force exerted by the brake booster is alterable by a force difference corresponding to the specified target force alteration quantity and a hydraulic braking force corresponds with the increase or the decrease in the at least one additional braking force;
   a second evaluation device configured to specify a target volume displacement quantity of a target volume displacement of a brake medium of the brake system between at least one chamber of an accumulator and a volume of the brake system outside the accumulator, in order to account for the specified target force alteration quantity, taking into account the at least one received signal; and
   a second actuation device controlling at least one brake medium delivery element of the brake system in a manner corresponding to the specified target volume displacement quantity in order to account for the altered assistance force, so that a volume of the brake medium corresponding to the specified target volume displacement quantity is displaceable one of: (i) from the at least one accumulator chamber to the volume of the brake system outside the accumulator and (ii) from the volume of the brake system outside of the accumulator to the at least one chamber of the accumulator, and so that a compensating force corresponding to the force difference is exertable on the brake input element,
   wherein the accumulator chamber includes at least one of:
   i) at least one plunger, and
   ii) at least one two-chamber cylinder, and wherein the at least one additional braking force is a force applied in addition to a hydraulic braking force of the brake system.

5. The control device as recited in claim 4, wherein the second actuation device is configured to controls at least one plunger motor as the at least one brake medium delivery element.

6. The control device as recited in claim 4, wherein the second actuation device controls at least one of: i) at least one pump, and ii) at least one valve as the at least one brake medium delivery element, taking into account the specified target volume displacement quantity.

7. A brake-boosted hydraulic brake system, comprising:
a brake booster acting on a force introduction element with an assistance force;
at least one of: i) at least one plunger, and ii) at least one two-chamber cylinder; and
a control device, including:
an input device configured to receive information relating to an increase or a decrease in at least one additional braking force exerted on at least one wheel of the vehicle and to send at least one received signal corresponding to the received information,
a first evaluation device configured to specify a target force alteration quantity exerted in a brake booster by performing a target alteration of an assistance force that supplements a driver braking force, wherein the target force alteration takes into account the at least one received signal,
a first actuation device controlling the brake booster in a manner corresponding to the specified target force alteration quantity, so that the assistance force exerted by the brake booster is alterable by a force difference corresponding to the specified target force alteration quantity and a hydraulic braking force corresponds with the increase or the decrease in the at least one additional braking force,
a second evaluation device configured to specify a target volume displacement quantity of a target volume displacement of a brake medium of the brake system between at least one chamber of an accumulator and a volume of the brake system outside the accumulator, in order to account for the specified target force alteration quantity, taking into account the at least one received signal, and
a second actuation device controlling at least one brake medium delivery element of the brake system in a manner corresponding to the specified target volume displacement quantity in order to account for the altered assistance force, so that a volume of the brake medium corresponding to the specified target volume displacement quantity is displaceable one of: (i) from the at least one accumulator chamber to the volume of the brake system outside the accumulator and (ii) from the volume of the brake system outside of the accumulator to the at least one chamber of the accumulator, and so that a compensating force corresponding to the force difference is exertable on the brake input element,
wherein the accumulator chamber includes at least one of:
i) at least one plunger, and ii) at least one two-chamber cylinder, and
wherein the at least one additional braking force is a force applied in addition to a hydraulic braking force of the brake system.

8. The brake-boosted hydraulic brake system, as recited in claim 7, wherein the at least one plunger includes a selfinhibiting coupling of an adjustable wall component of a plunger accumulator chamber to a plunger motor.

9. The brake-boosted hydraulic brake system as recited in claim 7, wherein the brake system includes at least one valve unit disposed at the input side of the at least one plunger.

10. The brake-boosted hydraulic brake system as recited in claim 7, wherein the brake booster is a brake booster that is controllable by at least one of open-loop and closed-loop control, the brake booster being a brake booster whose assistance force may be set independently of a driver force.

* * * * *